(12) United States Patent
Deichelbohrer

(10) Patent No.: US 11,381,133 B2
(45) Date of Patent: Jul. 5, 2022

(54) SPUR GEAR AND ITS METHOD OF FABRICATION, AND BRUSHLESS ELECTRIC MOTOR

(71) Applicant: Robert Bosch GmbH, Stuttgart (DE)

(72) Inventor: Rami Deichelbohrer, Appenweier (DE)

(73) Assignee: Robert Bosch GmbH, Stuttgart (DE)

(*) Notice: Subject to any disclaimer, the term of this patent is extended or adjusted under 35 U.S.C. 154(b) by 317 days.

(21) Appl. No.: 16/815,423

(22) Filed: Mar. 11, 2020

(65) Prior Publication Data
US 2020/0295623 A1 Sep. 17, 2020

(30) Foreign Application Priority Data
Mar. 14, 2019 (DE) ...................... 10 2019 203 482.9

(51) Int. Cl.
| | |
|---|---|
| H02K 7/116 | (2006.01) |
| F16H 55/17 | (2006.01) |
| B60T 13/74 | (2006.01) |
| H02K 11/215 | (2016.01) |
| H02K 21/14 | (2006.01) |
| F16H 57/08 | (2006.01) |
| F16H 1/28 | (2006.01) |
| B62D 5/04 | (2006.01) |

(52) U.S. Cl.
CPC ............ *H02K 7/116* (2013.01); *B60T 13/745* (2013.01); *F16H 55/17* (2013.01); *H02K 11/215* (2016.01); *H02K 21/14* (2013.01); *B62D 5/0403* (2013.01); *F16H 1/28* (2013.01); *F16H 57/08* (2013.01)

(58) Field of Classification Search
CPC ...... H02K 21/14; H02K 7/116; H02K 11/215; B60T 13/74; B60T 13/745; F16H 55/17; F16H 1/28; F16H 55/06; F16H 57/08; B62D 5/0403
USPC ............................................................ 310/83
See application file for complete search history.

(56) References Cited

U.S. PATENT DOCUMENTS

| | | | | |
|---|---|---|---|---|
| 4,404,504 A | * | 9/1983 | Giel ...................... | H02K 29/06 318/269 |
| 9,360,064 B2 | * | 6/2016 | Nadig ..................... | B24B 47/26 |
| 9,906,106 B1 | * | 2/2018 | Linares .................. | H02K 16/00 |
| 2013/0123057 A1 | * | 5/2013 | Markl .................... | B60K 17/16 475/150 |

FOREIGN PATENT DOCUMENTS

| | | |
|---|---|---|
| DE | 19752380 | 6/1998 |
| DE | 10339621 | 4/2005 |
| DE | 102014006374 | 11/2015 |
| DE | 102016226293 | 7/2018 |
| EP | 2762838 | 8/2014 |
| WO | 2013135258 | 9/2013 |

* cited by examiner

Primary Examiner — Alex W Mok
(74) Attorney, Agent, or Firm — Michael Best & Friedrich LLP

(57) ABSTRACT

The invention relates to a spur gear (1) for a transmission (35) for a brushless electric motor (10), having a toothed portion (32), with a receiving bore (38) formed in the region of the toothed portion (32) in order to receive a rotor shaft (30), and having a signal generating portion (34) rotationally fixed to the toothed portion (32) with multiple magnetic field generating regions (48), which are adapted to interact with a magnetic field sensing element (50) especially a Hall element, in order to detect the rotary angle position of the spur gear (1) as it turns about an axis of rotation (20).

13 Claims, 3 Drawing Sheets

SPUR GEAR AND ITS METHOD OF FABRICATION, AND BRUSHLESS ELECTRIC MOTOR

BACKGROUND

The invention relates to a spur gear for a transmission for a brushless electric motor, wherein the brushless electric motor is in particular part of a brake booster in a vehicle. Furthermore, the invention relates to a brushless electric motor having a spur gear according to the invention as well as a method for producing a spur gear according to the invention.

Electric motors as part of brake boosters are already known from the prior art, whereby the rotary motion of an output shaft of the electric motor is reduced by a transmission, in order to create a reciprocating movement of a shaft which in turn acts at least indirectly on the brake system of a vehicle.

If the electric motor is designed as a brushless electric motor, it is important to know the rotary angle position of the rotating rotor with respect to the fixed stator in order to actuate or energize the individual wire windings of the stator of the brushless electric motor. For this, it is already known how to design a spur gear connected to the rotor shaft as an output shaft, on the one hand, for force transmission or as part of the transmission, and on the other hand how to detect the rotary angle position of the spur gear rotationally fixed to the rotor shaft of the electric motor by arranging magnetic field generating regions or magnetic elements on the spur gear. Normally a Hall element as part of a Hall sensor is used for this, which moves past the magnetic field generating regions or magnetic elements and detects them by virtue of the change in the magnetic field, thereby making it possible to determine the rotary angle position of the rotor.

SUMMARY

The spur gear according to the invention for a transmission for a brushless electric motor has the benefit that it properly satisfies the functional requirements in regard to the formation of the magnetic field generating regions on the one hand, and those of a toothed portion serving for the force transmission on the other hand, and at the same time allows a simple and cost-effective production in regard to manufacturing technology.

For this, it is essentially proposed according to the invention that both the toothed portion and the signal generating portion on the spur gear, comprising the magnet generating regions, are formed as a common or monolithic sintered component, while different materials are used for the corresponding sections according to the different requirements of the toothed portion and the signal generating portion of the spur gear. These materials may have an especially low wear or a relatively high hardness, for example for the toothed portion, while for the signal generating portion it is provided to choose the material such that an especially easy or good magnetization of the material is made possible in order to generate the magnet generating regions.

Advantageous modifications of the spur gear according to the invention for a transmission for a brushless electric motor are set forth in the dependent claims.

In order to make possible an especially exact or precise detection of the rotary angle position of the rotor or a high resolution in the case of a stator having a multitude of wire windings, it is proposed in an advantageous design embodiment of the spur gear that the signal generating portion has a wall section situated radially about a longitudinal axis of the receiving bore of the spur gear and the magnetic field generating regions are situated in the region of the wall section. This makes possible a relatively large radial spacing between the receiving bore or the axis of rotation of the rotor shaft of the brushless electric motor or the spur gear and the magnetic field generating regions on the spur gear, allowing an arrangement of many magnetic field generating regions, especially those having alternating polarities, having spacings formed looking in the circumferential direction between the magnetic field generating regions.

In a modified design of the latter proposal, it is advantageous for the magnetic field generating regions to be situated at preferably uniform angular intervals about the receiving bore of the spur gear and to extend in the longitudinal direction of the radially extending wall section of the spur gear.

In another preferred design embodiment of the spur gear, making it possible to receive a bearing arrangement of the rotor shaft, it is proposed that the signal generating portion is pot shaped and has a ring or disk shaped section, which joins the toothed portion to the wall section of the signal generating portion, so that a receiving space to receive a bearing arrangement for the rotor shaft is formed inside the radially extending wall section of the spur gear.

One modification of the latter proposal consists in that the toothed portion looking in the direction of the receiving bore extends into the ring or disk shaped section of the signal generating portion and is joined there in a connection region to the signal generating portion, wherein a toothing of the toothed portion is arranged outside the receiving region.

The invention also relates to a brushless electric motor, especially as part of a brake booster, having a spur gear as described to this point.

Furthermore, the invention involves a method for fabrication of a spur gear for a transmission of a brushless electric motor, especially a spur gear designed according to the invention, wherein the spur gear has a toothed portion and a signal generating portion comprising multiple magnetic field generating regions. The method according to the invention is characterized in that the toothed portion and the signal generating portion are fabricated as a single or monolithic sintered component using different materials.

In a modification of the production method according to the invention, it is provided that the toothed portion and the signal generating portion are fabricated at least almost at the same time. In this way, especially relatively short production times and thus a high performance of a die for production of the spur gear can be achieved.

There are various ways of magnetizing the magnetic field generating regions in the signal generating portion of the spur gear. In a first variant, it is provided that the magnetic field generating regions of the signal generating portion are created during the fabrication of the spur gear by magnetization of the material of the sintered material in the die. Advantageously, at least some of the time for the fabrication of the sintered component can be used at the same time for the magnetization.

In an alternative embodiment, it may also be provided that the magnetic field generating regions of the signal generating portion are created after the fabrication of the spur gear by magnetization of the material of the sintered material outside the die. Such a configuration minimizes the production time for a spur gear in the die and furthermore it has the advantage that the magnetization can occur more easily and effectively by devices situated outside the die.

BRIEF DESCRIPTION OF THE DRAWINGS

Further benefits, features and details of the invention will emerge from the following description of preferred exemplary embodiments and with the aid of the drawings.

DETAILED DESCRIPTION

The same or functionally equivalent elements are given the same reference numbers in the figures.

Figure 1:
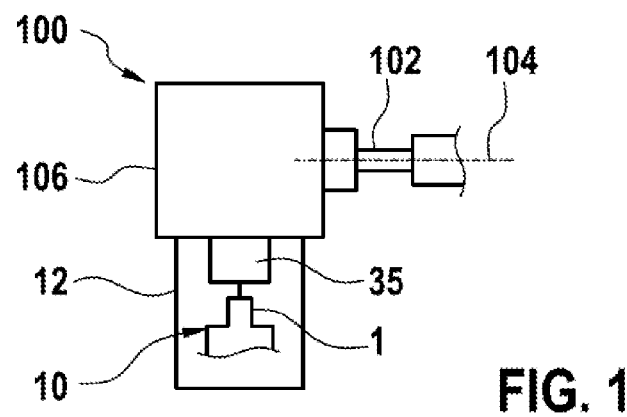
FIG. 1 shows in schematic representation a brake booster for a motor vehicle with a brushless electric motor.

FIG. 1 shows, highly simplified, a brake booster 100 as part of a brake system in a vehicle. The brake booster 100 comprises an actuating element in the form of a rod 102 which is able to move in the direction of a longitudinal axis 104 of the rod 102, serving at least indirectly to generate a braking force on wheels of the vehicle.

Figure 2:
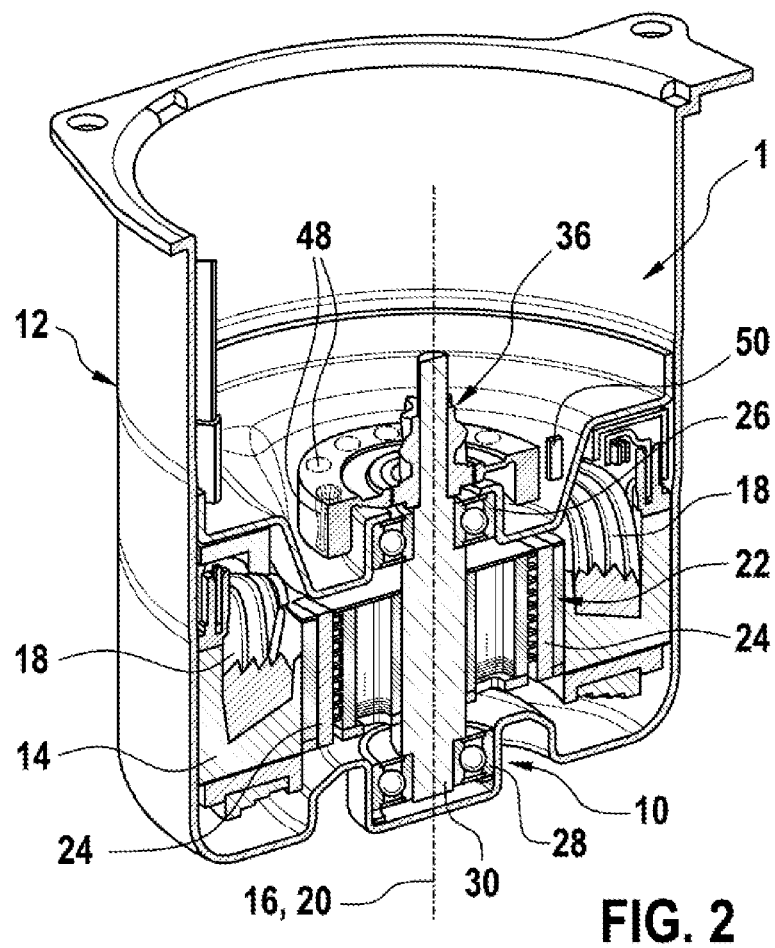
FIG. 2 shows a longitudinal section in the region of the brushless electric motor of the brake booster of FIG. 1.

The brake booster 100 comprises a brake booster housing 106, to which is flanged a motor housing 12 of an electric motor 10, which is especially noticeable in FIG. 2. The electric motor 10 is designed as a brushless electric motor 10 and comprises, according to the representation of FIG. 2, a stator 14 arranged in the motor housing 12 and having for example ten copper wire windings 18 arranged at uniform angular spacings about a longitudinal axis 16 of the stator 14. The stator 14 cooperates in a known manner with a rotor 22 rotatably mounted about an axis of rotation 20, the axis of rotation 20 running coaxially to the longitudinal axis 16. On the outer circumference of the rotor 22 there are arranged in a known manner permanent magnet elements 24, likewise at uniform angular spacings about the axis of rotation 20. Thanks to consecutive energization of the individual copper wire windings 18 of the stator 14, the rotor 22 is placed in rotation. The rotor 22 comprises a rotor shaft 30 arranged for example in two axially spaced apart bearing arrangements 26, 28. The rotor shaft 30 is rotationally fixed to a spur gear 1. The spur gear 1, shown individually in FIG. 3, comprises a toothed portion 32 and a signal generating portion 34.

The spur gear 1 is part of a transmission 35, schematically shown individually only in FIG. 1, especially a planetary transmission, which serves for reducing the rotational speed of the electric motor 10 while at the same time increasing its torque. Furthermore, the electric motor 10 serves at least for indirectly driving the rod 102.

Figure 3:
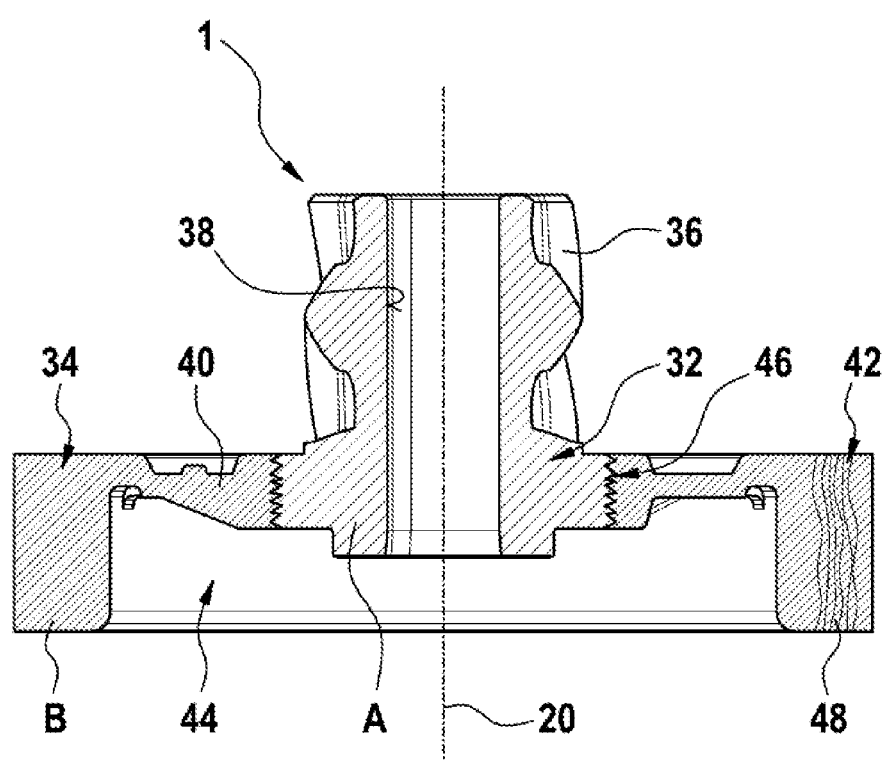
FIG. 3 shows a longitudinal section through a spur gear, such as is used in the electric motor of FIG. 2.

As is especially noticeable with the aid of FIG. 3, the toothed portion 32 comprises a toothing 36 outside of the signal generating portion 34, which cooperates with transmission wheels, not shown, such as planet gears of the planetary transmission. Thus, the spur gear 1 in a planetary transmission forms a sun gear. The toothed portion 32 is substantially sleeve shaped and has a receiving bore 38, which runs concentrically to the axis of rotation 20. The rotor shaft 30 (not shown) is received inside the receiving bore 38, preferably forming by a press fit a rotationally fixed connection between the spur gear 1 or the toothed portion 32 and the rotor shaft 30.

The signal generating portion 34 is basically pot shaped and comprises a ring or disk shaped section 40 running perpendicular to the axis of rotation 20, adjoined by a wall section 42 radially encircling the axis of rotation 20. A receiving space 44 is formed radially inside the wall section 42, serving in particular to receive the one bearing arrangement 26, which can be seen in FIG. 2.

The spur gear 1 is formed as a sintered component or produced in a sintering process, using different materials or different metal powders for the materials A, B of the toothed portion 32 and the signal generating portion 34. The toothed portion 32 protrudes in the axial direction, i.e., looking in the direction of the axis of rotation 20, as far as the height of the disk shaped section 40 of the signal generating portion 34 and is joined there in a connection region 46 as a single piece or monolithically to the disk shaped section 40.

Figure 4:
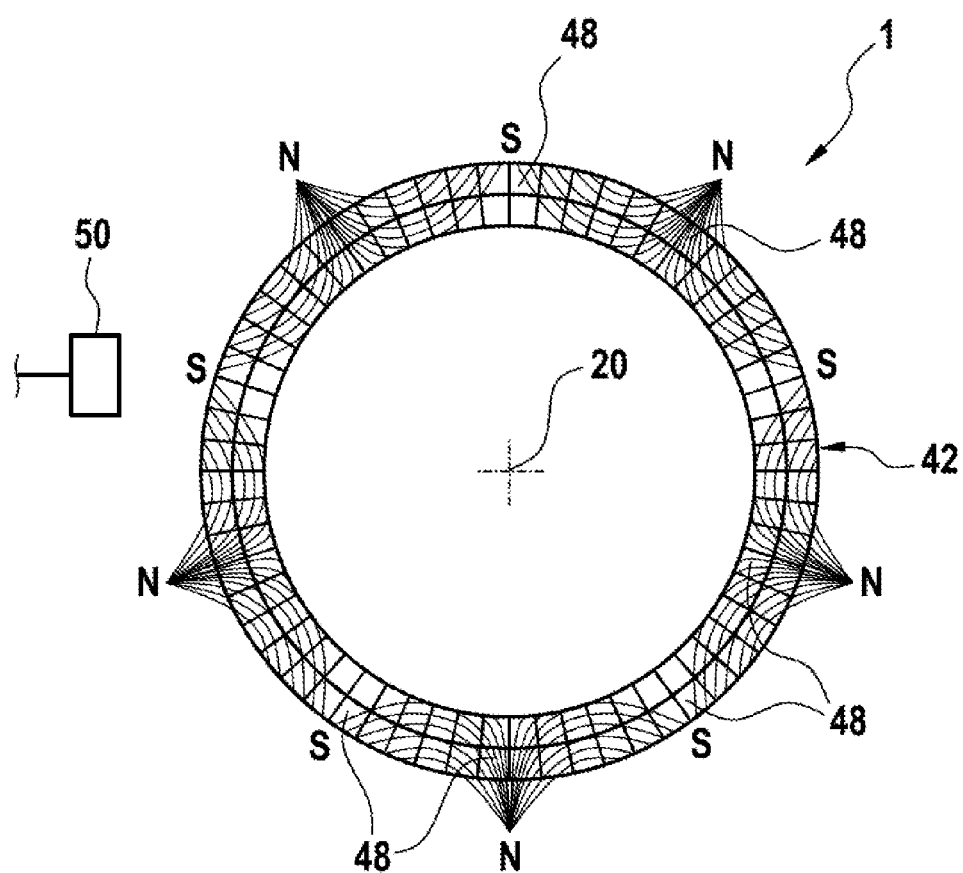
FIG. 4 shows a cross section in the region of a signal generating portion of the spur gear to illustrate the arrangement of the magnetic field generating regions.

The material of the toothed portion 32 consists of a material A (such as a copper, nickel and molybdenum-containing sintering steel), which is distinguished by an especially good resistance to wear and/or hardness, especially in regard to the functionality of the power takeoff or the force transmission of the spur gear 1 as part of the transmission 35. On the contrary, the material B of the pot-shaped signal generating portion 34 consists in particular of a readily magnetizable material, such as strontium or cobalt hard ferrite. This is due to the fact that the signal generating portion 34, as is especially evident from FIG. 4, comprises for example ten magnetic field generating regions 48 looking in the circumferential direction about the axis of rotation 20, which are arranged preferably at the same angular intervals about the axis of rotation 20. The magnetic field generating regions 48 are formed by a magnetizing of ferromagnetic particles of the material B for the signal generating portion 34. The magnetic field generating regions 48 interact with a sensor element 50, recognizable only in FIGS. 2 and 4, especially as part of a Hall sensor. In a known manner, it is possible in this way to infer the rotary angle position of the rotor 20 during the turning of the rotor 20, in order to thereby actuate or energize the copper wire windings 18 of the stator 14 at the proper time or angle.

The magnetic field generating regions 48 are formed or arranged in the region of the wall section 42 and extend in the longitudinal direction of the wall section 42, i.e., parallel to the axis of rotation 20. However, the direction of magnetization is oriented preferably radially, so that north poles and south poles alternate on the circumference. The sensor element 50 is then arranged in particular radially facing the circumference of the signal generating portion 34.

The fabrication of the spur gear 1 in the sintering process is done by a common die (not shown) by introducing the materials for the toothed portion 32 and the signal generating portion 34 preferably at least almost at the same time, or at consecutive times, followed by pressing the material under high heat and pressure, in a known manner. The formation of the magnetic field generating regions 48 can be done either by magnetization in the region of the die, or after removal of the formed spur gear 1 in a separate device.

The spur gear 1 described to this point can be changed or modified in various ways without departing from the idea of the invention.

The invention claimed is:

1. A spur gear (1) for a transmission (35) for a brushless electric motor (10), having a toothed portion (32), with a receiving bore (38) formed in the region of the toothed portion (32) in order to receive a rotor shaft (30), and having a signal generating portion (34) rotationally fixed to the toothed portion (32) with multiple magnetic field generating regions (48), which are adapted to interact with a magnetic field sensing element (50) in order to detect the rotary angle position of the spur gear (1) as the spur gear (1) turns about an axis of rotation (20), wherein the spur gear (1) is formed as a sintered component, and wherein the materials (A, B) of the sintered material for the toothed portion (32) and for the signal generating portion (34) are different.

2. The spur gear according to claim 1,
characterized in that
the signal generating portion (34) has a wall section (42) situated radially about the receiving bore (38) and the magnetic field generating regions (48) are situated in the region of the wall section (42).

3. The spur gear according to claim 2,
characterized in that
the magnetic field generating regions (48) are situated at uniform angular intervals about the axis of rotation (20) of the receiving bore (38) and extend in the longitudinal direction of the wall section (42) or parallel to the axis of rotation (20).

4. The spur gear according to claim 2,
characterized in that
the signal generating portion (34) is pot shaped and has a ring or disk shaped section (40), which joins the toothed portion (32) to the wall section (42) of the signal generating portion (34), so that a receiving space (44) to receive a bearing arrangement (26) for the rotor shaft (30) is formed radially inside the wall section (42).

5. The spur gear according to claim 4,
characterized in that
the toothed portion (32) looking in the direction of the axis of rotation (20) of the receiving bore (38) extends into the ring or disk shaped section (40) of the signal generating portion (34) and is joined there in a connection region (46) to the signal generating portion (34) and a toothing (36) of the toothed portion (32) is arranged axially outside the signal generating portion (34) or the receiving space (44).

6. The spur gear according to claim 2,
characterized in that
the toothed portion (32) has radial teeth (36), whose radial extension is situated radially entirely inside the wall section (42).

7. A brushless electric motor (10), especially as part of a brake booster (100) or a power steering, having a spur gear (1) designed according to claim 1.

8. A method for fabrication of a spur gear (1) for a transmission (35) of a brushless electric motor (10), especially a spur gear (1) designed according to claim 1, wherein the spur gear (1) has a toothed portion (32) and a signal generating portion (34) comprising multiple magnetic field generating regions (48),
characterized in that
the toothed portion (32) and the signal generating portion (34) are fabricated as a monolithic sintered component using different materials (A, B) for the toothed portion (32) and the signal generating portion (34).

9. The method according to claim 8,
characterized in that
the toothed portion (32) and the signal generating portion (34) are fabricated at least almost at the same time.

10. The method according to claim 8,
characterized in that
the magnetic field generating regions (48) of the signal generating portion (34) are created during the fabrication of the spur gear (1) by magnetization of its material (B) in the die for producing the spur gear (1).

11. The method according to claim 8,
characterized in that
the magnetic field generating regions (48) of the signal generating portion (34) are created after the fabrication of the spur gear (1) by magnetization of its material (B) outside the die for producing the spur gear (1).

12. The spur gear according to claim 1,
characterized in that
the magnetic field sensing element (50) is a Hall element.

13. The spur gear according to claim 5,
characterized in that
the toothed portion (32) is joined in the connection region (46) to the signal generating portion (34) in a form fitting manner.

\* \* \* \* \*